US009727706B2

(12) United States Patent
Fruchtman et al.

(10) Patent No.: US 9,727,706 B2
(45) Date of Patent: Aug. 8, 2017

(54) METHODS CIRCUITS APPARATUSES SYSTEMS AND ASSOCIATED COMPUTER EXECUTABLE CODE FOR METERING SOFTWARE USAGE

(71) Applicant: SOFTWATCH TECHNOLOGIES 2009 LTD., Givat Hashlosha (IL)

(72) Inventors: Oded Fruchtman, Kiriat Haim (IL); Moshe Kozlovski, Ganey Am (IL); Uri Arad, Tel Aviv (IL); Meni Milstein, Tel-Aviv (IL); Konstantin Vayner, Petach Tikva (IL)

(73) Assignee: SOFTWATCH TECHNOLOGIES 2009 LTD., Givat Hashlosha (IL)

( * ) Notice: Subject to any disclaimer, the term of this patent is extended or adjusted under 35 U.S.C. 154(b) by 303 days.

(21) Appl. No.: 14/076,229

(22) Filed: Nov. 10, 2013

(65) Prior Publication Data
US 2014/0189102 A1    Jul. 3, 2014

Related U.S. Application Data

(60) Provisional application No. 61/732,426, filed on Dec. 3, 2012.

(51) Int. Cl.
*G06F 21/10*      (2013.01)
*H04L 12/26*      (2006.01)

(52) U.S. Cl.
CPC ........ *G06F 21/105* (2013.01); *H04L 43/0876* (2013.01)

(58) Field of Classification Search
CPC .......................... G06F 21/105; H04L 43/0876
USPC ........................................................ 709/224
See application file for complete search history.

(56) References Cited

U.S. PATENT DOCUMENTS

| | | | |
|---|---|---|---|
| 2008/0005686 A1* | 1/2008 | Singh | G06F 3/0483 715/764 |
| 2008/0148253 A1* | 6/2008 | Badwe | G06F 21/10 717/174 |
| 2008/0215468 A1* | 9/2008 | Monsa-Chermon | G06Q 10/00 705/34 |
| 2011/0320957 A1* | 12/2011 | Tiddens | G06F 3/04817 715/747 |
| 2014/0137261 A1* | 5/2014 | Chen | G06F 21/105 726/26 |
| 2014/0366150 A1* | 12/2014 | Fang | H04L 63/101 726/26 |

* cited by examiner

*Primary Examiner* — Michael C Lai
(74) *Attorney, Agent, or Firm* — Vladimir Sherman; Professional Patent Solutions (57) ABSTRACT

Disclosed are methods, circuits, apparatuses, systems and associated computer executable code for metering software usage. The usage of a software application instance is detected by assessing a level of user interaction with the software application instance, in order to: classify users based on their usage patterns, determine the license type needed for a variety of user and application combinations, save on excess licensing, and/or facilitate the transition of users between on-premise applications and cloud based applications.

20 Claims, 12 Drawing Sheets

METHODS CIRCUITS APPARATUSES SYSTEMS AND ASSOCIATED COMPUTER EXECUTABLE CODE FOR METERING SOFTWARE USAGE

FIELD OF THE INVENTION

The present invention relates generally to the field of Software Applications Management. More specifically, the present invention relates to methods, circuits, apparatuses, systems and associated computer executable code for metering software usage.

BACKGROUND

Companies across the world spend Billions of Dollars each year on software licenses. According to research analysts at least 20% of software owned by companies is never used. Furthermore companies tend to buy expensive software licenses which they don't fully utilize instead of buying cheaper licenses or use the right software package they need. For instance, purchasing a full Editor license, instead of a Viewer one.

When it comes to moving business applications to the cloud, organizations find themselves blind and overwhelmed by the magnitude of the change hence in most of the cases they will choose to remain with their current expensive business applications instead of transferring the organization to cheaper license models on the cloud (e.g. MS Office vs. Google Apps or Office 365). One of the arguments for not making the shift is that the cloud business applications don't offer the same functionality as the desktop ones. In the case of MS Office the solution is to move light users to the cloud and leave the heavy ones on premise. But again, organizations don't have sufficient tools that can analyze and classify users based on their usage type and working patterns.

The same goes for organizations that are considering VDI (Virtual Desktop Infrastructure) which offers a way to manage software licenses centrally on dedicated servers. The challenge in VDI projects is to divide the organization's user population into different VDI groups that share the same usage profiles, meaning they use the same software applications.

Analyzing the usage of software applications can be challenging in modern computer environments. Knowing whether an application is installed and running is not enough. For instance, there are some applications that will automatically launch during the start of the computer (Auto Run) and will run in the background while the user isn't utilizing them at all. Another example would be users who have full editor licenses while they never edit documents but only read them. As a result, conventional technologies for software metering may be inaccurate or inefficient when it comes to analyzing such cases. It is with respect to these and other considerations that the disclosure made herein is presented.

Taking the above into account, there clearly remains a need, in the field of software licensing and software usage analysis, for better and more efficient systems and methods for accurate software usage metering and classification that are at least partially based on the monitoring of actual software application usage made by users and/or the monitoring of software application related components' operation characteristics.

SUMMARY OF THE INVENTION

The present invention includes methods, circuits, apparatuses, systems and associated computer executable code for metering software usage and user classification. According to some embodiments of the present invention, the usage of a software application instance may be detected. Detecting the usage may include assessing a level of user interaction with the software application instance and determining, based on the assessed level of user interaction: (1) whether, and/or which type of, license is actually needed; and/or (2) whether the user is a good candidate for working on a cloud application instead of an on-premise one.

According to some embodiments, assessing the level of interaction may include monitoring: (1) software application installation; (2) software application execution duration; (3) software application foreground duration; (4) software application events, wherein software application events may include: (a) keyboard events, (b) mouse events, and/or (c) file open/save events; (5) web browsing events; and/or (6) any combination of the above.

According to some embodiments, an assessed level of user interaction may be associated with a specific user and application combination. The level of user interaction may be assessed for a plurality of user and application combinations. An enterprise level report indicating: (1) a number, and/or types, of licenses required per software application, and/or (2) a listing of user and application combinations, wherein the user is a candidate for working on a cloud application instead of an on-premise one; may be generated, based on the assessed levels of user interaction for substantially all user and application combinations within an enterprise.

According to some embodiments, based on the assessed level of user interaction with a software application instance 'usage type' classifications may be assigned to respective user and application combination(s). Based on their assigned classifications software users may be transitioned between on-premise applications and cloud applications.

According to some exemplary embodiments, a default 'Not Active' usage type may be initially assigned to a given user and application combination and retained until the application is first run (executed) by the user; the 'Not Active' usage type may indicate that there is currently no need for a software license, for the given user and application combination.

Once the application is run (executed) by the user and moved to the foreground of the display, a 'Viewer' usage type may be assigned to the given user and application combination and retained until, based on monitored keyboard and/or mouse software events, it is determined that an editing action has been executed using the application and an 'Editor' usage type may be assigned to the given user and application combination. The 'Viewer' usage type may, in most cases, indicate that there is currently no need for a full 'Editor' software license, for the given user and application combination.

Based on the amount and type of monitored keyboard and/or mouse software events, a 'Light Editor' usage type or a 'Heavy Editor' usage type may be assigned to the given user and application combination. While both a 'Light Editor' usage type or a 'Heavy Editor' usage type may indicate that there is need for a full Editor software license; a 'Light Editor' usage type may suggest that the user, of the given user and application combination, may be shifted to a 'cloud' version of the application, whereas a 'Heavy Editor' usage type may suggest that the user, of the given user and application combination, should remain on an 'on premise' version of the application, regardless of the additional software license costs.

According to some embodiments, the level of cloud applications adoption vs. on premise application adoption among user(s) of software application instances may be monitored. Software users may be transitioned between on-premise applications and cloud applications, at least partially considering monitored adoption levels. According to some embodiments, a dynamic threshold may be set to determine whether the assessed levels of user(s) interaction makes them good candidate(s) to shift to a cloud application. The dynamic threshold may be used as a tool by which the organization tunes its risk taking policy and the pace of the transition. Low level threshold means that the organization is less inclined to take risks and thus prefers a slower and more gradual transition process. High level threshold means that the organization is cost savings oriented and is willing to take more risks and expedite the transition. According to some embodiments, the dynamic threshold may, for example, be used to determine between a 'Light Editor' usage type and a 'Heavy Editor' usage type and accordingly between a 'cloud' and a 'on premise' software version. The dynamic threshold maybe a dynamic amount and/or type of keyboard and/or mouse software events, and may be tuned in order to optimize the utilization of software license resources in the enterprise. For example, if the organization is less inclined to take risks, a lower threshold may be set such that more user and software combinations are labeled as 'Heavy Editors' and thus a slower and more gradual transition process takes place. Conversely, if the organization is cost savings oriented, a higher threshold may be set such that less user and software combinations are labeled as 'Heavy Editors' and the transition process is expedited.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1A is a functional block diagram of an exemplary configuration of a system for metering users' interaction with software applications, in accordance with some embodiments of the present invention, wherein monitored software interaction data is relayed to a server for interaction level assessment;

FIG. 1B is a functional block diagram of an exemplary configuration of a system for metering users' interaction with software applications, in accordance with some embodiments of the present invention, wherein software interaction level assessment is performed on the client side by a user device agent application;

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals, or titles, may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus a lay be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMS) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention includes methods, circuits, apparatuses, systems and associated computer executable code for metering software usage and user classification. According to some embodiments of the present invention, the usage of a software application instance may be detected. Detecting the usage may include assessing a level of user interaction with the software application instance and determining, based on the assessed level of user interaction: (1) whether, and/or which type of, license is actually needed; and/or (2) whether the user is a good candidate for working on a cloud application instead of an on-premise one.

According to some embodiments, assessing the level of interaction may include monitoring: (1) software application installation; (2) software application execution duration; (3) software application foreground duration; (4) software application events, wherein software application events may include: (a) keyboard events, (b) mouse events, and/or (c) file open/save events; (5) web browsing events; and/or (6) any combination of the above.

According to some embodiments, an assessed level of user interaction may be associated with a specific user and application combination. The level of user interaction may be assessed for a plurality of user and application combinations. An enterprise level report indicating: (1) a number, and/or types, of licenses required per software application, and/or (2) a listing of user and application combinations, wherein the user is a candidate for working on a cloud application instead of an on-premise one; may be generated, based on the assessed levels of user interaction for substantially all user and application combinations within an enterprise.

Figure 1A:
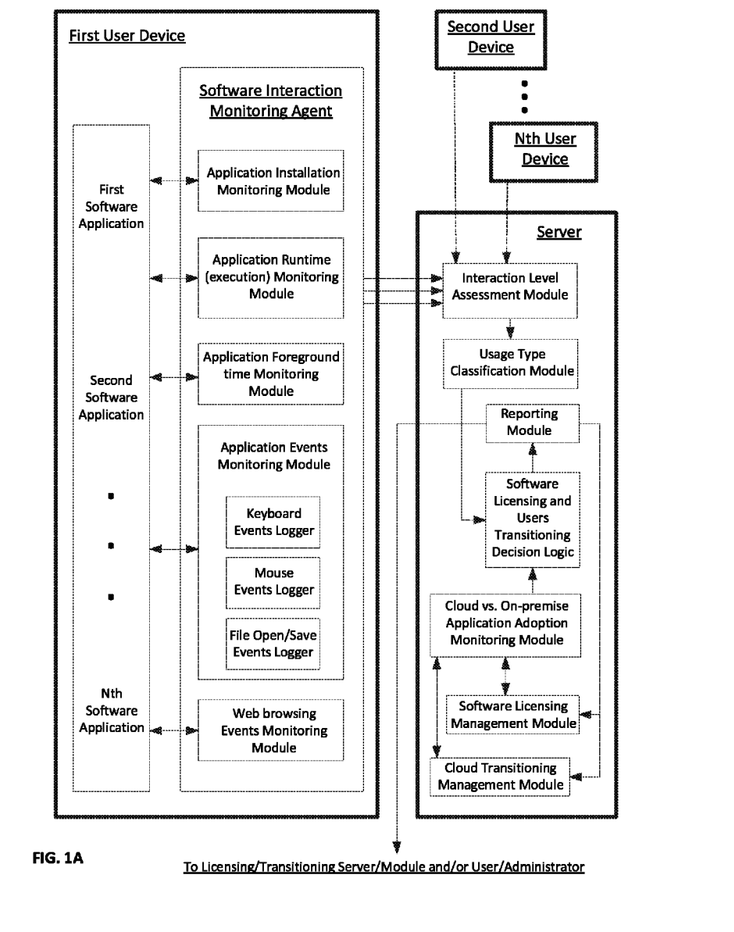
FIG. 1A is a functional block diagram of an exemplary system for metering users' interaction with software applications and classifying users based on software usage, in accordance with some embodiments of the present invention, wherein software licensing procurement and/or user transitioning to cloud applications are managed at least partially based on the metered interaction levels and resulting classification.

In FIG. 1A there is shown, in accordance with some embodiments of the present invention, a functional block diagram of an exemplary system for metering users' interaction with software applications and classifying users based on software usage, wherein software licensing procurement and/or user transitioning to cloud applications are managed at least partially based on the metered interaction levels and resulting classification.

Software Interaction Monitoring Agents are installed on or more User Devices, monitoring, for each User Device, parameters related to the Device's Interaction with one or more Software Applications. The Monitoring Agent includes modules for monitoring the installation, runtime, foreground time, keyboard mouse and file open/save events and/or web browsing events, of the Software Applications installed-on/interacted-by the User Device on which the Monitoring Agent is installed.

Monitored data from all Monitoring Agents is relayed to a Server where an Interaction Level Assessment Module analyzes the monitored interaction data, assessing and grading the software application interaction levels for each software application and user combination, on each monitored User Device. Based on the assessed application interaction levels a Usage Type Classification Module classifies the various 'application and user combinations' into usage type categories based on which a Software Licensing and Users Transitioning Decision Logic determines, for each application and user combination, whether and/or which type of, license is actually needed, and/or whether the user is a good candidate for working on a cloud application instead of an on-premise one.

Based on the decisions made by the Software Licensing and Users Transitioning Decision Logic, a Reporting Module provides details indicating the number(s), and/or types, of licenses required per software application, and/or a listing of user and application combinations, wherein the user is a candidate for working on a cloud application instead of an on-premise one or vice versa.

The details provided by the Reporting Module are relayed to Licensing and/or Transitioning Servers/Modules for performing and managing the actual acquisition of software licenses and/or the transition of users to/from cloud application versions. The details provided by the Reporting Module are further utilized by a Cloud vs. On-Premise Application Adoption Monitoring Module for providing the Software Licensing and Users Transitioning Decision Logic with data relating to the general software usage related trends within the enterprise, allowing it to also consider available/remaining organizational resources and or policies, when making software procurement decisions and/or software users cloud transitioning decisions.

According to some embodiments, the Server may comprise User/Administrator Interface Module that allows for the managing, adjusting, modifying and/or tuning of various system parameters and operation characteristics by a user/administrator; and/or for presenting to a networked user/administrator details from, and/or reports generated by, the Reporting Module.

Figure 1B:
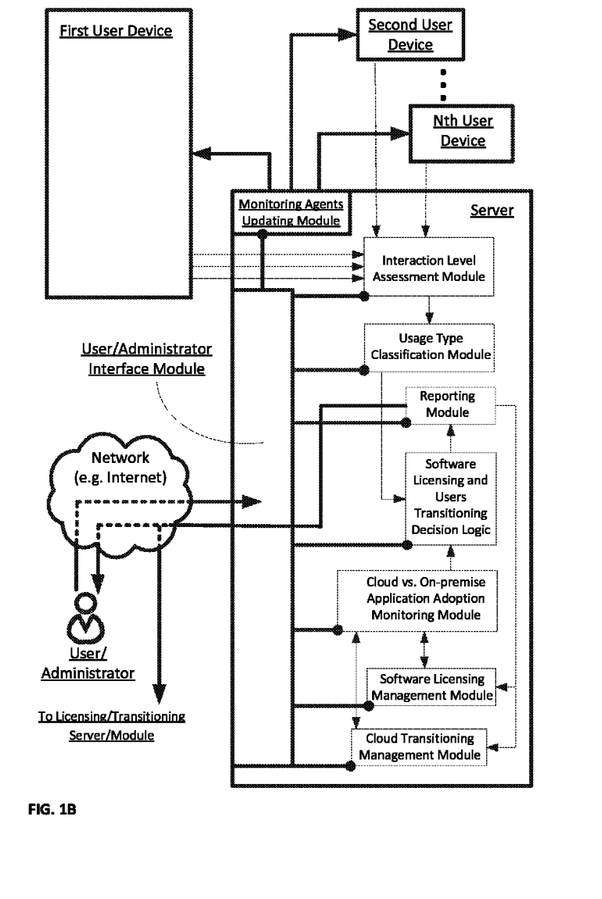
FIG. 1B is a functional block diagram of an exemplary system for metering users' interaction with software applications and classifying users based on software usage, in accordance with some embodiments of the present invention, including a user/administrator interface module for presenting to a user/administrator licensing, transitioning and/or system related reports and/or relaying instructions from the user/administrator to the different modules of the system.

In FIG. 1B there is shown, in accordance with some embodiments of the present invention, a functional block diagram of an exemplary system for metering users' interaction with software applications and classifying users based on software usage, comprising a User/Administrator Interface Module.

The User/Administrator Interface Module allows for a user/administrator to interface with and manage: A Monitoring Agents Updating Module for setting/resetting the times and types of the monitoring agent applications' updates; the Interaction Level Assessment Module for setting/resetting the monitored data filtering conditions, analysis logics and interaction level grading keys and scales; the Usage Type Classification Module for setting/resetting the thresholds and conditions based on which user and application combinations are classified; the Reporting Module for setting/resetting the types of reports, the types and formats of information they include and their intended recipients; the Software Licensing and Users Transitioning Decision, Management and Monitoring Modules for updating enterprise budgets, constrains, inclinations, policies and trends that may be considered and affect Licensing and Transitioning decisions; and/or, any combination of some or all of the above.

The User/Administrator Interface Module further allows for a user/administrator to be presented with details, such as licensing, transitioning and/or system related details, reports and/or statistics.

Figure 2A:
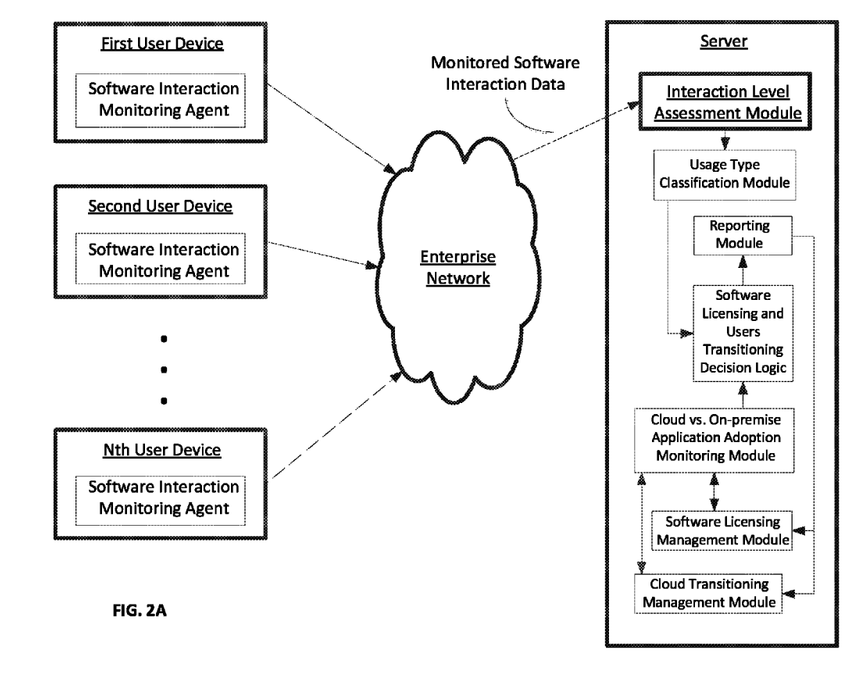
Figure 2B:
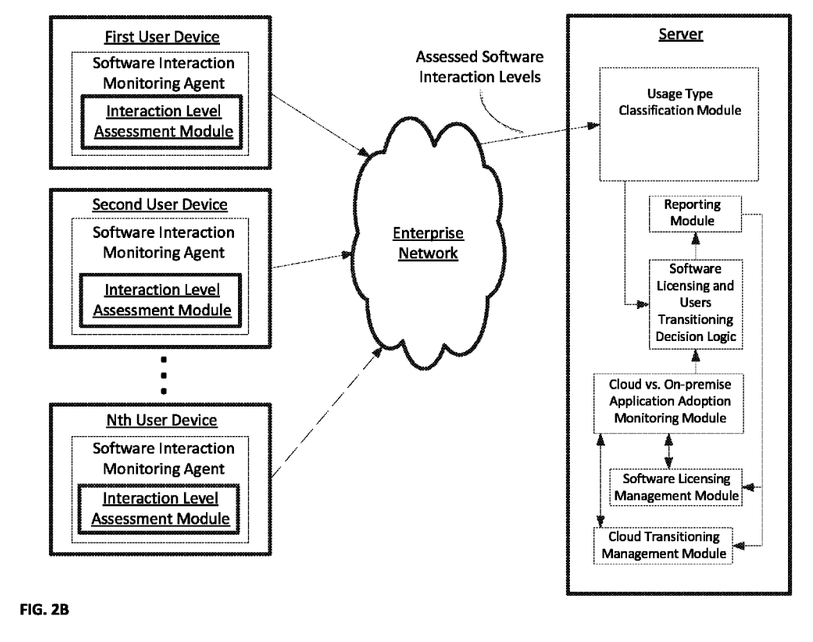

According to some embodiments of the present invention, the Software Interaction Monitoring Agents installed on User Devices may relay, over an organizational or a public communication network, all Monitored Software Interaction Data to the Server's Interaction Level Assessment Module for filtering, processing and analysis. According to some exemplary embodiments, at least part of the data filtering, processing and analysis made as part of the Software Interaction Level Assessment may be performed by Interaction Level Assessment Modules which are part of the Software Interaction Monitoring Agents installed on the User Devices. Accordingly, the Software Interaction Monitoring Agents may relay, over an organizational or a public communication network, Monitored Software Interaction Data, that has already been at least partially processed, to the Server's Interaction Level Assessment Module and/or directly to the Usage Type Classification Module.

In FIG. 2A there is shown, in accordance with some embodiments of the present invention, a functional block diagram of an exemplary configuration of a system for metering users' interaction with software applications, wherein monitored software interaction data is relayed to a server for interaction level assessment.

In FIG. 2B there is shown, in accordance with some embodiments of the present invention, a functional block diagram of an exemplary configuration of a system for metering users' interaction with software applications, wherein at least part of the software interaction level assessment is performed on the client side by a user device agent application.

Figure 3:
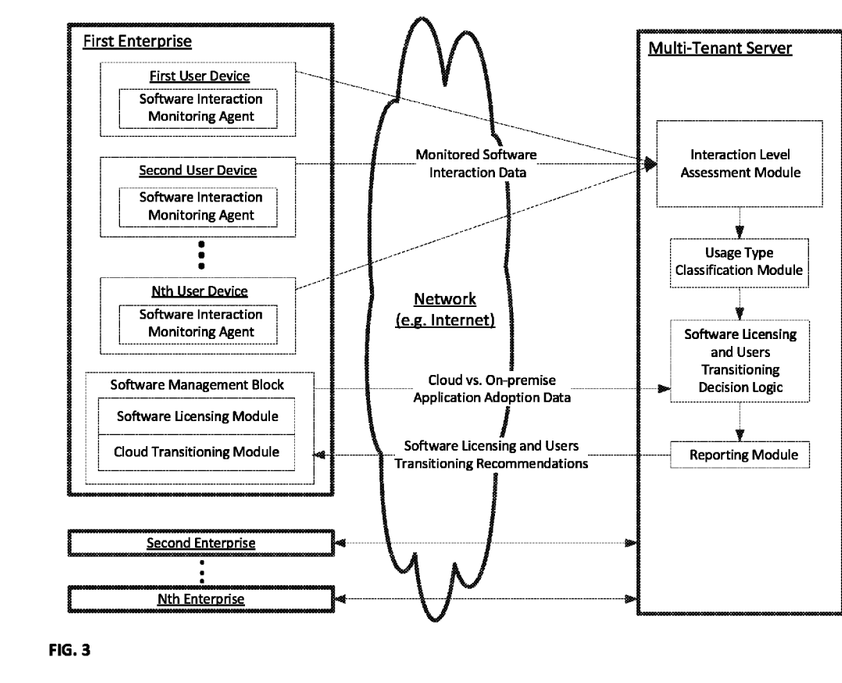
FIG. 3 is a functional block diagram of an exemplary configuration of a system for metering users' interaction with software applications, in accordance with some embodiments of the present invention, wherein monitored software interaction data from multiple enterprises is relayed to a server for interaction level assessment.

According to some embodiments of the present invention, the Server may serve multiple software-managing enterprises or clients. Software Interaction Data from two or more different enterprises may be relayed to the Server where it may be separately assessed for Interaction Level(s), classified for Usage Type, and used for deciding on and reporting Software Licensing and Users Transitioning Recommendations, back to the respective enterprises from which the initial data was received.

According to some embodiments, actual Cloud vs. On-premise Application Adoption Data, from each of the monitored enterprises, may be relayed back to the Server from an enterprise Software Management Block including a Software Licensing Module and/or a User Transitioning Module. Actual Application Adoption Data, of a given enterprise, received by the server may be considered by the Server's Software Licensing and Users Transitioning Decision Logic as part of later software management recommendations made for that enterprise.

According to some embodiments, the Server may be a multi tenant server adapted to utilize a single instance of the software it is running for separately serving multiple clients/organizations/enterprises (tenants).

In FIG. 3 there is shown, in accordance with some embodiments of the present invention, a functional block diagram of an exemplary configuration of a system for metering users' interaction with software applications, wherein monitored software interaction data from multiple enterprises is relayed to a server for interaction level assessment.

According to some embodiments, based on the assessed level of user interaction with a software application instance 'usage type' classifications may be assigned to respective user and application combination(s). Based on their assigned classifications software users may be transitioned between on-premise applications and cloud applications.

According to some exemplary embodiments, a default 'Not Active' usage type may be initially assigned to a given user and application combination and retained until the application is first run (executed) by the user; the 'Not Active' usage type may indicate that there is currently no need for a software license, for the given user and application combination.

Once the application is run (executed) by the user and moved to the foreground of the display, a 'Viewer' usage type may be assigned to the given user and application combination and retained until, based on monitored keyboard and/or mouse software events, it is determined that an editing action has been executed using the application and an 'Editor' usage type may be assigned to the given user and application combination. The 'Viewer' usage type may, in most cases, indicate that there is currently no need for a full 'Editor' software license, for the given user and application combination.

Based on the amount and type of monitored keyboard and/or mouse software events, a 'Light Editor' usage type or a 'Heavy Editor' usage type may be assigned to the given user and application combination. While both a 'Light Editor' usage type or a 'Heavy Editor' usage type may indicate that there is need for a full Editor software license; a 'Light Editor' usage type may suggest that the user, of the given user and application combination, may be shifted to a 'cloud' version of the application, whereas a 'Heavy Editor' usage type may suggest that the user, of the given user and application combination, should remain on an 'on premise' version of the application, regardless of the additional software license costs.

Figure 4:
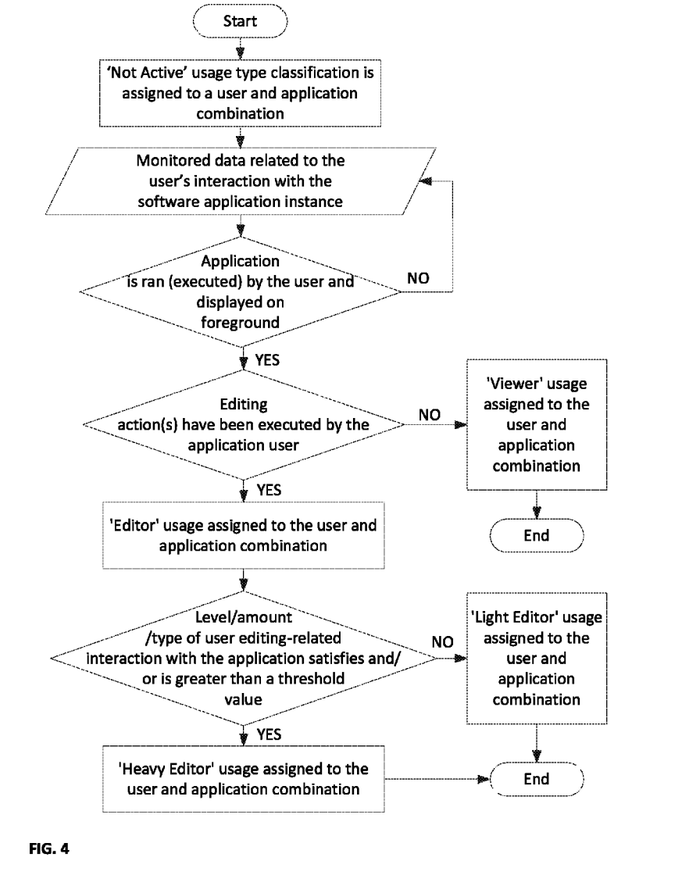
FIG. 4 is a flow chart diagram of an exemplary usage type classification process, in accordance with some embodiments of the present invention, wherein software users are classified based on their interaction with software applications.

In FIG. 4 there is shown a flow chart diagram of an exemplary usage type classification process, in accordance with some embodiments of the present invention, wherein software users are classified based on their interaction with software applications.

Figure 5:
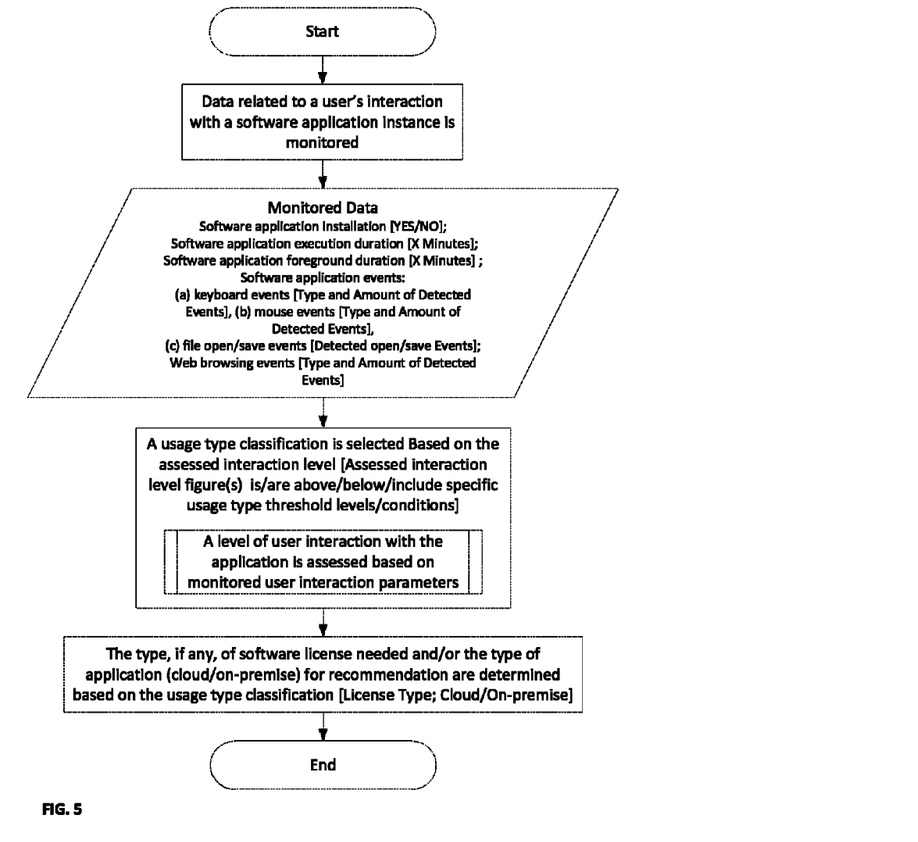
FIG. 5 is a flow chart diagram of an exemplary decision process template, in accordance with some embodiments of the present invention, wherein monitored parameters related to user's interaction with software applications are collected, assessed, and utilized for classifying user and software combinations into usage type categories, and, software licensing and user transitioning decisions are made based on the usage type classifications.

FIG. 5 is a flow chart diagram of an exemplary decision process template, in accordance with some embodiments of the present invention, wherein monitored parameters related to user interactions with software applications are collected, assessed, and utilized for classifying user and software combinations into usage type categories, and, software licensing and user transitioning decisions are made based on the usage type classifications.

FIGS. 6A-6E are flow chart diagrams showing the exemplary decision process template of FIG. 5, being utilized for several exemplary samples of user and application combinations' parameters, in accordance with some embodiments of the present invention.

Figure 6A:
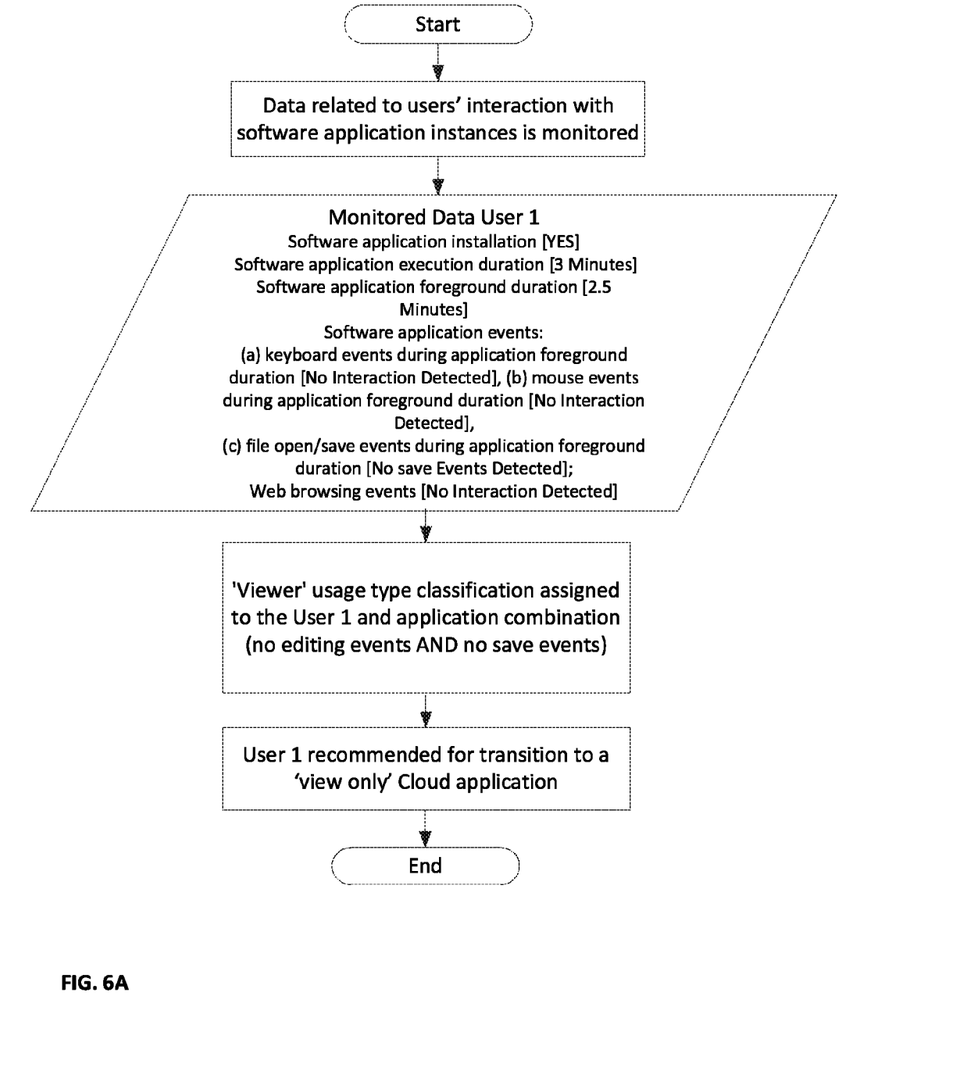
FIGS. 6A-6E are flow chart diagrams showing the exemplary decision process template of FIG. 5, being utilized for several exemplary samples of user and application combinations' parameters, in accordance with some embodiments of the present invention.

In FIG. 6A a 'Viewer' usage type classification has been assigned to the user and application combination as no editing AND no save events have been detected. Accordingly, user 1 has been recommended for transition to a 'view only' cloud application.

Figure 6B:
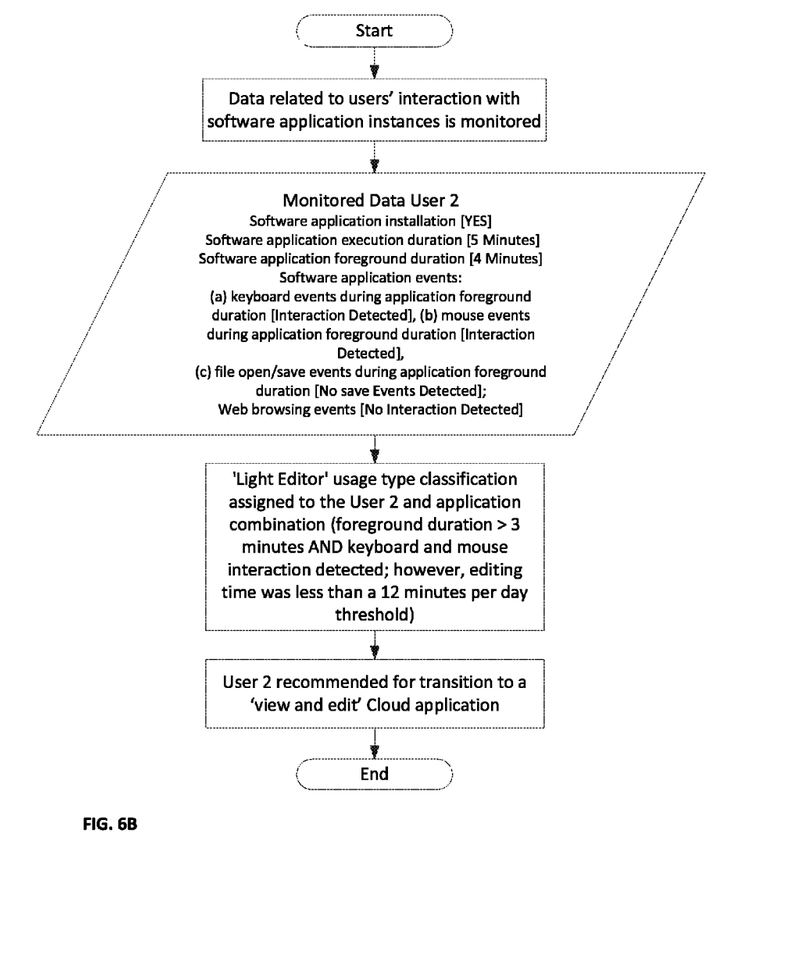

In FIG. 6B a 'Light Editor' usage type classification has been assigned to the user and application combination as the editing time detected was less than 12 min per day (the default threshold). Accordingly, user 2 has been recommended for transition to a 'view and edit' cloud application.

Figure 6C:
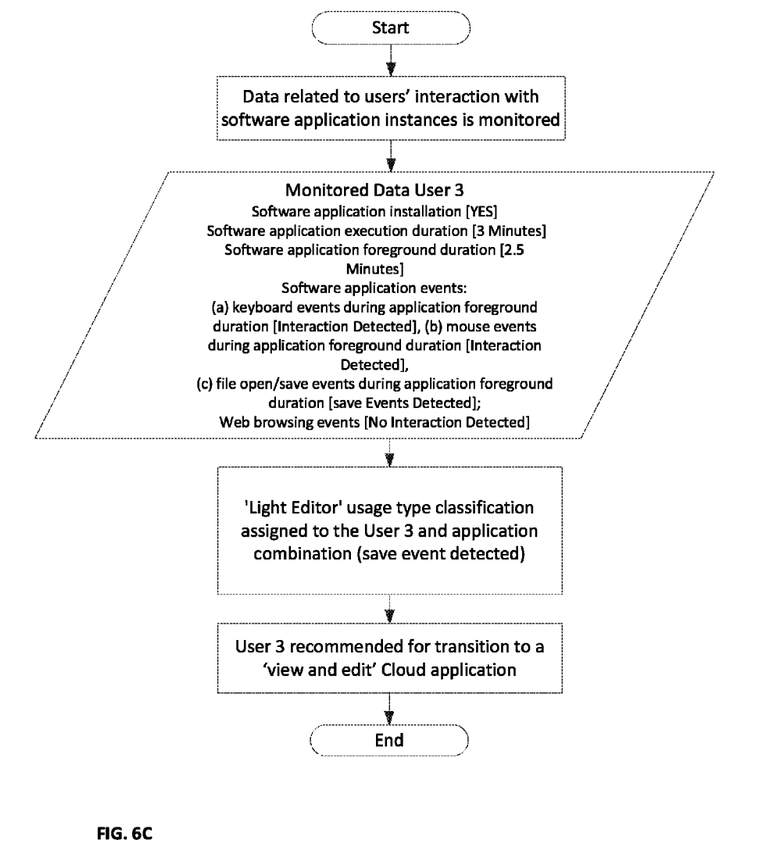

In FIG. 6C a 'Light Editor' usage type classification has been assigned to the user and application combination, regardless of the application's foreground duration being lesser than 3 minutes, as a save event has been detected. Accordingly, user 3 has been recommended for transition to a 'view and edit' cloud application.

Figure 6D:
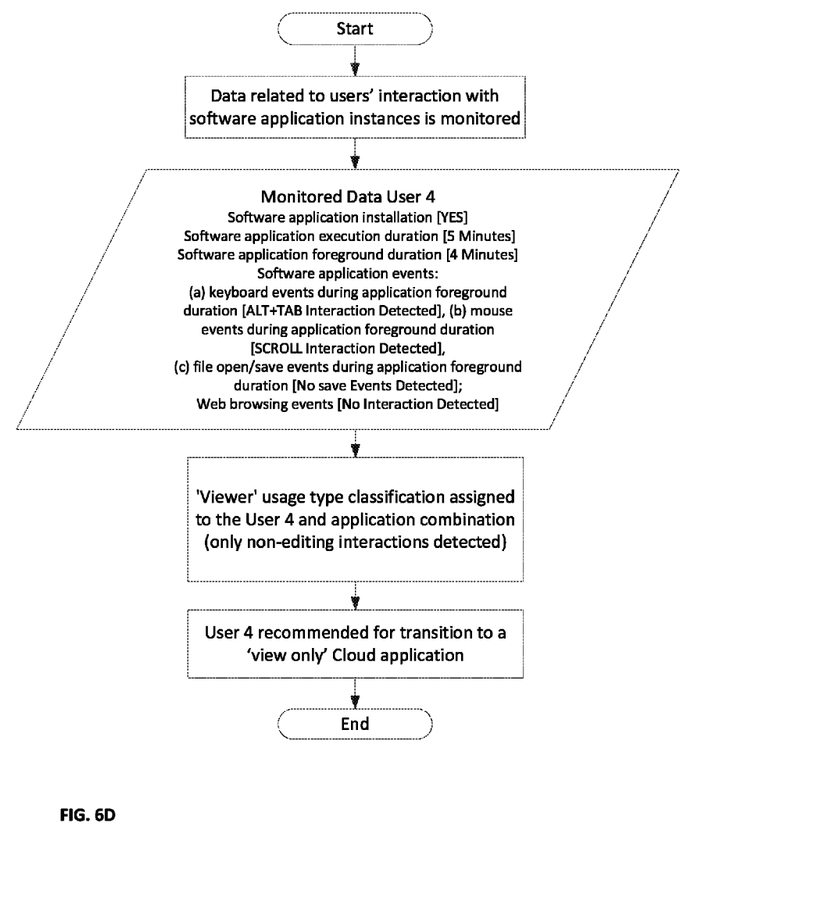

In FIG. 6D a 'Viewer' usage type classification has been assigned to the user and application combination, regardless of the fact that keyboard and mouse interactions have been detected, as only non-editing keyboard and mouse interactions have been detected. Accordingly, user 4 has been recommended for transition to a 'view only' cloud application.

Figure 6E:
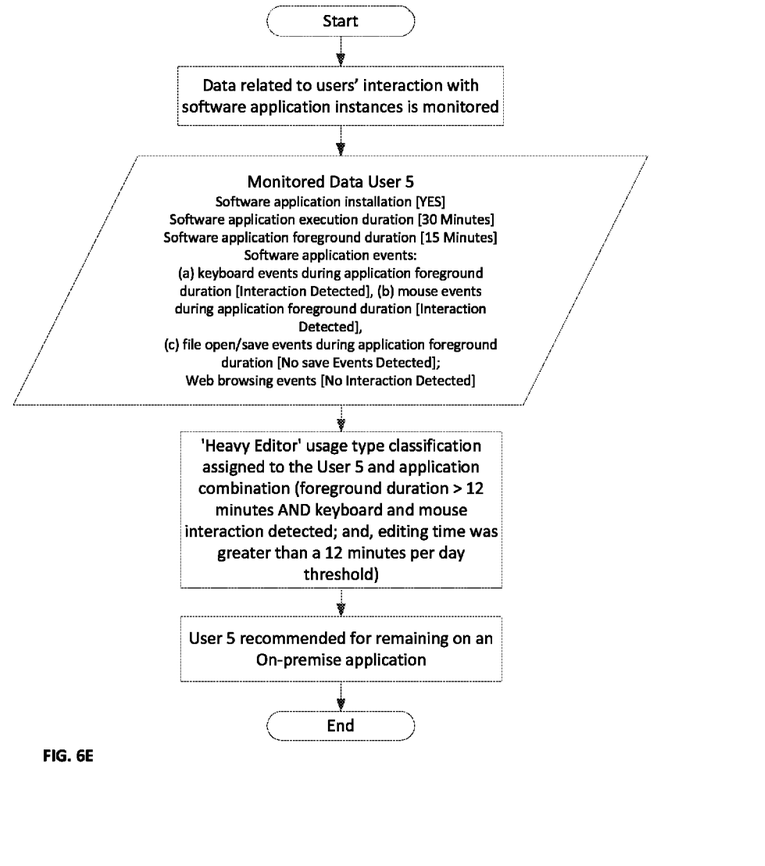

In FIG. 6E a 'Heavy Editor' usage type classification has been assigned to the user and application combination as the application's editing interactions were greater than 12 minutes per day. Accordingly, user 5 has been recommended for remaining on an on-premise application.

According to some embodiments, the level of cloud applications adoption vs. on premise application adoption among user(s) of software application instances may be monitored. Software users may be transitioned between on-premise applications and cloud applications, at least partially considering monitored adoption levels. According to some embodiments, a dynamic threshold may be set to determine whether the assessed levels of user(s) interaction makes them good candidate(s) to shift to a cloud application. The dynamic threshold may be used as a tool by which the organization tunes its risk taking policy and the pace of the transition. Low level threshold means that the organization is less inclined to take risks and thus prefers a slower and more gradual transition process. High level threshold means that the organization is cost savings oriented and is willing to take more risks and expedite the transition. According to some embodiments, the dynamic threshold may, for example, be used to determine between a 'Light Editor' usage type and a 'Heavy Editor' usage type and accordingly between a 'cloud' and a 'on premise' software version. The dynamic threshold maybe a dynamic amount and/or type of keyboard and/or mouse editing events, and may be tuned in order to optimize the utilization of software license resources in the enterprise. For example, if the organization is less inclined to take risks, a lower threshold may be set such that more user and software combinations are labeled as 'Heavy Editors' and thus a slower and more gradual transition process takes place. Conversely, if the organization is cost savings oriented, a higher threshold may be set such that less user and software combinations are labeled as 'Heavy Editors' and the transition process is expedited.

While certain features of the invention have been illustrated and described herein, many modifications, substitutions, changes, and equivalents will now occur to those skilled in the art. It is, therefore, to be understood that the appended claims are intended to cover all such modifications and changes as fail within the true spirit of the invention.

What is claimed:

1. A method for optimizing software license utilization, said method comprising:
    installing software interaction monitoring agents on a set of computing devices;
    using the installed software interaction monitoring agents to each monitor user interactions, of a respective user of a respective computing device of the set of computing devices, with an instance of a first software application installed on the respective computing device, said monitoring of user interactions including: (1) monitoring a foreground duration the first software application is active in a foreground of a display of the respective computing device, and (2) monitoring interactions of the respective user with the first software application using input devices of the respective computing device, while the first software application is active in the foreground of the display of the respective computing device;
    assessing, using the software interaction monitoring agents, a level of interaction of each of the respective users of the set of computing devices with the first software application, based on the foreground durations and interactions monitored by the software interaction monitoring agents;
    classifying each combination of the first software application and each of the respective users of the set of computing devices, as one of a list of usage types, based on the assessed levels of interaction; and
    using a central server to automatically determine, for each of the respective users of the set of computing devices, based on the classifications: (i) a software license type of the first software application for the respective user or (ii) a decision to transition the first software application to become a cloud application for the respective user.

2. The method according to claim 1, further comprising using the installed software interaction monitoring agents to monitor file save events performed by the first software application and factoring the file save events when assessing a level of interaction of each of the respective users of the set of computing devices with the first software application.

3. The method according to claim 2, further comprising classifying a combination of the first software application and one of the respective users of the set of computing devices, as editor classification based on the monitored file save events.

4. The method according to claim 3, further comprising generating an enterprise level report indicating a number of licenses required per software application corresponding to an assessed level of user interaction for each application.

5. The method according to claim 1, wherein monitoring interactions of the respective user with the first software application using input devices of the respective computing device includes monitoring: (1) keyboard events, (2) mouse events, (3) file save events, and (4) web browsing events.

6. The method according to claim 1, further comprising using the installed software interaction monitoring agents to monitor keyboard events of the first software application and factoring the keyboard events when assessing a level of interaction of each of the respective users of the set of computing devices with the first software application.

7. The method according to claim 1, further comprising using the installed software interaction monitoring agents to monitor mouse events of the first software application and factoring the mouse events when assessing a level of interaction of each of the respective users of the set of computing devices with the first software application.

8. The method according to claim 1, further comprising using the installed software interaction monitoring agents to monitor browser events of the first software application and factoring the browser events when assessing a level of interaction of each of the respective users of the set of computing devices with the first software application.

9. A system for optimizing software license utilization, said system comprising:
    a first processor functionally associated with a digital memory, said digital memory containing software interaction monitoring agents configured to:
    (i) be installed on a set of computing devices;
    (ii) monitor user interactions of a user of a respective computing device of the set of computing devices, with an instance of a first software application installed on the respective computing device, the monitoring of user interactions including: (1) monitoring a foreground duration the first software application is active in a foreground of a display of the respective computing device, and (2) monitoring interactions of the respective user with the first software application using input devices of the respective computing device, while the first software application is active in the foreground of the display of the respective computing device;

(iii) assess a level of interaction of the respective user with the first software application, based on the monitored foreground duration and the monitored interactions; and (iv) classify a combination of the first software application and the respective user, as one of a list of usage types, based on the assessed level of interaction;

and a server adapted to automatically determine, for each one of the respective users of the set of computing devices, based on the classifications: (i) a software license type of the first software application for the respective user or (ii) a decision to transition the first software application to become a cloud application for the respective user.

10. The system according to claim 9, wherein monitoring interactions of the respective user with the first software application using input devices of the respective computing device includes monitoring: (1) keyboard events, (2) mouse events, (3) file save events, and (4) web browsing events.

11. The system according to claim 9, wherein said software interaction monitoring agents are adapted to further: (i) monitor file save events performed by the first software application and (ii) factor the monitored file save events when assessing a level of interaction of the respective user with the first software application.

12. The system according to claim 11, wherein an editor classification is based on monitored file save events.

13. The system according to claim 12, wherein said server is further adapted to generate an enterprise level report indicating a number of licenses required per software application corresponding to an assessed level of user interaction for each application.

14. The system according to claim 9, wherein said software interaction monitoring agents are adapted to further: (i) monitor keyboard events of the first software application and (ii) factor the monitored keyboard events when assessing a level of interaction of the respective user with the first software application.

15. The system according to claim 9, wherein said software interaction monitoring agents are adapted to further: (i) monitor mouse events of the first software application and (ii) factor the monitored mouse events when assessing a level of interaction of the respective user with the first software application.

16. The system according to claim 9, wherein said software interaction monitoring agents are adapted to further: (i) monitor browser events of the first software application and (ii) factor the monitored browser events when assessing a level of interaction of the respective user with the first software application.

17. A system for optimizing software license utilization, said system comprising:

a first processor functionally associated with a digital memory, said digital memory containing software interaction monitoring agents configured to:

(i) be installed on a set of computing devices;

(ii) monitor user interactions of a user of a respective computing device of the set of computing devices, with an instance of a first software application installed on the respective computing device, the monitoring of user interactions including monitoring file save events performed by the first software application;

(iii) assess a level of interaction of the respective user with the first software application, based on the monitored interactions; and (iv) classify a combination of the first software application and the respective user, as one of a list of usage types, based on the assessed level of interaction;

and a server adapted to automatically determine, for each one of the respective users of the set of computing devices, based on the classifications: (i) a software license type of the first software application for the respective user or (ii) a decision to transition the first software application to become a cloud application for the respective user.

18. The system according to claim 17, wherein said software interaction monitoring agents are adapted to further: (i) monitor keyboard events of the first software application and (ii) factor the monitored keyboard events when assessing a level of interaction of the respective user with the first software application.

19. The system according to claim 17, wherein said software interaction monitoring agents are adapted to further: (i) monitor mouse events of the first software application and (ii) factor the monitored mouse events when assessing a level of interaction of the respective user with the first software application.

20. The system according to claim 17, wherein said software interaction monitoring agents are adapted to further: (i) monitor browser events of the first software application and (ii) factor the monitored browser events when assessing a level of interaction of the respective user with the first software application.

\* \* \* \* \*